United States Patent Office 3,282,939
Patented Nov. 1, 1966

---

3,282,939
STABILIZATION OF ORGANIC MATERIAL WITH STABILIZERS CONTAINING A SUBSTITUTED PHENOL GROUP
John D. Spivack, Spring Valley, and Martin Dexter, Briarcliff Manor, N.Y., assignors to Geigy Chemical Corporation, Greenburgh, N.Y., a corporation of Delaware
No Drawing. Filed Apr. 29, 1963, Ser. No. 276,191
11 Claims. (Cl. 260—247.7)

This application is a continuation-in-part of our co-pending application Serial Number 148,739, filed October 30, 1961, now abandoned.

This invention relates to the stabilization of polyolefins, e.g. polypropylene, and/or other unstable organic material with stabilizers containing a substituted phenol group. The invention also relates to a method of preparing stabilized polyolefins, e.g. polypropylene, and/or other organic material subject to degradation due, for example to oxidation in air, thermal degradation, or deterioration due to radiant energy such as visible and/or ultraviolet light.

More specifically, the invention pertains to stabilization of polypropylene and/or other organic material normally subject to oxidative, thermal and/or light induced deterioration with a stabilizer of the formula:

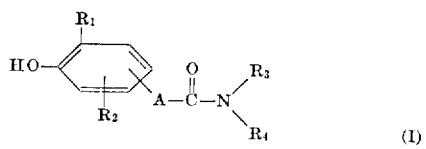

(I)

wherein

A is an alkylene group (straight or branched chain)—especially lower alkylene, i.e. having up to 6 carbon atoms, e.g. methylene, ethylene, propylene, butylene, pentylene, hexylene, with structures—such as

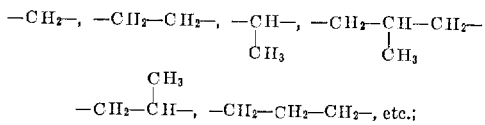

$R_1$ is a tertiary alkyl group, e.g., of 4 to 18 carbon atoms, preferably a tertiary butyl group;

$R_2$ represents one or more alkyl groups, e.g., of from 1 to 18 carbon atoms, especially from 1 to 8 carbon atoms, or hydrogen; but in the case of a tertiary alkyl group it is understood that bulky groups such as the tertiary butyl group are not contemplated in positions adjacent to one another in the phenyl nucleus;

$R_3$ is an alkyl group, preferably having from 1 to 24 carbon atoms, or an alkylphenyl, or an alkylbenzyl group, said alkylphenyl or alkylbenzyl group having preferably 7 or 8 to 24 carbon atoms, especially dodecylphenyl or dodecylbenzyl, or hydrogen or hydroxyalkyl, preferably hydroxyloweralkyl;

$R_4$ is an alkyl group, preferably having from 1 to 24 carbon atoms, or an alkylphenyl, or an alkylbenzyl group, said alkylphenyl or alkylbenzyl group having preferably 7 or 8 to 24 carbon atoms, especially dodecylphenyl or dodecylbenzyl, but in the case of tertiary alkyl groups or other bulky groups, $R_3$ and $R_4$ cannot both be such bulky groups; or (alkylthio)-lower alkylene, especially having from 2 to 20 carbon atoms; or (di-lower alkylamino)-lower alkylene, especially having from 3 to 15 carbon atoms; or (carbalkoxy)-lower alkylene, especially having from 3 to 14 carbon atoms; or (alkanamido)-lower alkylene, especially having from 3 to 14 carbon atoms; or the group of the formula

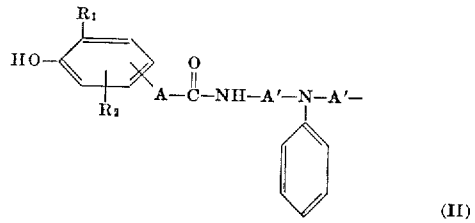

(II)

wherein
$R_1$, $R_2$ and A are defined as above, and
A' is defined the same as A;

$R_3$ and $R_4$ taken together may be a cyclic radical such as a heterocyclic radical—preferably morpholino—so that $R_3$ and $R_4$, when joined to the nitrogen of the Formula I, form said cyclic radical.

Thus it is seen that the compounds of the Formula I may contain a carboxamino group derived from a carboxyl group and a substituted amino group, such as mono- or dialkylamino, preferably having from 1 to 36 carbon atoms, e.g., methyl- or dimethylamino, ethyl- or diethylamino, propyl- or dipropylamino, butyl- or dibutylamino, pentyl- or dipentylamino, hexyl- or dihexylamino, heptyl- or diheptylamino octyl- or dioctylamino, nonyl- or dinonylamino, decyl- or decyloctylamino, undecylamino, dodecylamino, didodecylamino, tridecylamino, tetradecylamino, pentadecylamino, hexadecylamino, heptadecylamino, octadecylamino, etc.

Accordingly, it is a prime object of the invention to provide stable organic material, e.g., stable polymeric material, preferably polypropylene. In this specification it is understood that polymeric material means polyolefins such as polyethylene, etc. Preferably the polyolefins are of high molecular weight, e.g., above 1000 into the hundreds of thousands range. The polyethylenes and polypropylenes may be of high density, medium density or low density class.

Polymeric materials such as the foregoing find use as thermoplastic molding or coating agents. Moreover, because of their high dielectric strength and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc.

Not only homopolymeric material, but also copolymers and physical mixtures thereof are stabilized according to the present invention. For example, high impact polystyrene containing copolymers of butadiene and styrene are stabilized according to the invention.

The invention is also particularly useful in stabilizing lubricating oils of various types including aliphatic esters such as, e.g., dihexyl azelate, di-(2-ethylhexyl)azelate, di - (3,5,5 - trimethylhexyl)glutarate, di - (3,5,5 - trimethylpentyl)glutarate, di-(2-ethylhexyl)pimelate, di-(2-ethylhexyl)adipate, diisoamyl adipate, triamyl tricarballylate, pentaerythritol tetracaproate, dipropylene glycol dipelargonate, 1,5-pentanediol-di-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g., gasolines, both natural and synthetic, in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

It is furthermore an object of the present invention to provide novel substituted amide compounds which are versatile and effective stabilizers in at least a single class of the foregoing organic materials which are normally subject to deterioration caused by exposure to light and/or heat and/or oxygen, etc.

A particularly preferred stabilizer of the invention is N,N-di-n-dodecyl - 3,5-di-t-butyl - 4-hydroxyphenylacetamide, which is especially useful in stabilizing polyolefinic material, e.g. polypropylene and polyethylene, as well as other polymeric material, e.g. polystyrene, in particular, high impact polystyrene. This stabilizer is also an effective stabilizer for other relatively unstable organic material, e.g. hydrocarbon oil of mineral origin, in particular, mineral oil; gasoline, both natural and synthetic; oils of animal origin, in particular, lard; oils of vegetable origin, in particular, peanut oil; high temperature lubricating oils, e.g. diesters of fatty acids, in particular, diesters of fatty acids having from 5 to 15 carbon atoms per molecule. Further organic materials which are effectively stabilized by this compound comprise: aldehydes, e.g. aliphatic, such as heptaldehydes.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer including duration and degree of activity are among the factors which control the choice of a specific stabilizer for a specific substrate which is normally subject to deterioration. Toxicity, color, stability to light and/or heat and solubility are also important factors. For example, preferred compositions according to the invention comprise from about 0.001% to about 5% by weight of either N,N-di-n-dodecyl - 3,5-di-t-butyl - 4-hydroxyphenylacetamide, or N-n-octadecyl - β-(3,5-di-t-butyl - 4-hydroxyphenyl)propionamide, or N-n-octadecyl-3,5-di-t-butyl-4-hydroxyphenylacetamide, and polypropylene.

In general, stabilizers of the invention are employed in a concentration of from about 0.001% to about 5% by weight, preferably from about 0.01% to about 1% by weight. The specific concentration used varies with the substrate and the stabilizer, but the following ranges are preferred.

Concentrations of about 0.001% to about 1% by weight for the stabilizer in polyethylene are useful. In polypropylene from about 0.05% to about 1% by weight of stabilizer is especially useful. For polystyrene from about 0.1% to about 1% by weight is useful. In mineral oils, concentrations of from about 0.005% to about 1% by weight of stabilizer are used. Gasolines are stabilized with from about 0.01% to about 0.1% by weight of stabilizer, preferably about 0.05% by weight. Fatty material of animal origin such as lard is stabilized with from about 0.001% to about 0.1% by weight of stabilizer. Oils of vegetable origin such as cotton seed oil are similarly stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as, e.g., about 0.01% by weight in heptaldehyde. High temperature lubricants which are essentially diesters, e.g. diisoamyladipate, are stabilized with from about 0.5% to about 5%, preferably about 2%, by weight of a stabilizer according to the invention.

The compounds of this invention may be used also to stabilize organic material in combination with other additive agents such as, e.g., antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet absorbers, dyes, pigments, metal chelating agents, etc.

A particularly useful stabilizer system for polymeric material comprises a stabilizer of the formula I and dilauryl-beta-thio-di-propionate (hereinafter referred to as DLTDP). Generally from about 0.005% to about 10% (based on the stabilized composition) by weight of DLTDP and other stabilizers, e.g. of the formula I, are employed. Polypropylene is advantageously stabilized with about 0.5% by weight of DLTDP and 0.5% by weight of a stabilizer of the formula I.

In place of DLTDP, other similar diesters are usefully employed with the stabilizers of the formula I for stabilization of organic material, e.g., polypropylene. Such diesters as the following are useful:

$$\begin{array}{c} CH_2(CH_2)_nCOOR_7 \\ | \\ S \\ | \\ CH_2(CH_2)_nCOOR_8 \end{array}$$

wherein $n$ is a small number, e.g. 1 or 2; and
$R_7$ and $R_8$ are each independently an alkyl group, e.g. having 8 to 24 carbon atoms.

The amide stabilizer compounds of the invention are prepared in a number of ways. Thus, for example, these amides are prepared by reaction of the acid chloride precursor compound with the appropriate amino or morpholino, etc., moiety. The reaction is carried out advantageously in the presence of a hydrogen chloride acceptor such as, e.g., triethylamine. These amides may also be prepared by conventional methods as, e.g., by the reaction of an alkylamine and the appropriate precursor acid.

The following reaction schemes illustrate several methods of preparing the compounds of the invention.

(1)

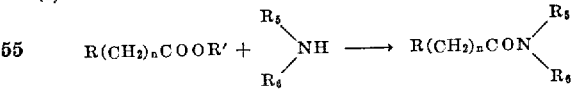

(2)

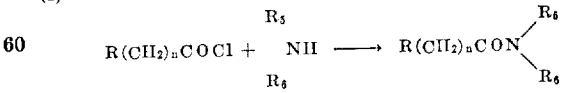

where

R is a hydroxyphenyl mono- or dialkyl-substituted radical;
$n$ is a small whole number, e.g. 1 or 2;
R' is hydrogen or alkyl;
$R_5$ is hydrogen or alkyl;
$R_6$ is alkyl;
$R_5$ and $R_6$ taken together can represent e.g. alkyleneoxy-alkylene to make a morpholino radical.

Although the foregoing hindered phenol acids, esters, acyl halides, etc. illustrate especially useful methods of preparing the compounds of the invention, nevertheless other substituted phenols are useful too, e.g., compounds of the Formula III:

wherein

R$_1$, R$_2$ and A are defined as in Formula I; and
Y can be cyano, carboxy, carbalkoxy, carboxyl halide, etc.

Other starting materials include primary or secondary amines having alkyl groups (including tertiary alkyl groups, e.g. t-butyl) such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, etc., or amines having alkaryl, aralkyl, alkylarylalkyl groups, etc.

The following examples are illustrative of the invention only, and there is no intention to limit the scope of the invention thereto. In the following examples parts are by weight, unless otherwise specified, and temperature is in degrees centigrade. The relationship between parts by weight and parts by volume is as grams to cubic centimeters.

*Example 1.—N-n-octadecyl-3,5-di-t-butyl-4-hydroxyphenyl-acetamide*

8.1 parts of octadecylamine and 3.0 parts of triethylamine are dissolved in 70 parts by volume of dry benzene, and 8.6 parts of 3,5-di-t-butyl-4-hydroxyphenylacetyl chloride, dissolved in 20 parts by volume of dry benzene, are added dropwise at 35° over a period of 10 minutes. The reactants are heated under reflux for 3 hours. 4.2 parts of triethylamine hydrochloride are filtered off, and the clear filtrate is washed with distilled water and with saturated sodium bicarbonate solution, dried over anhydrous sodium sulfate, and the solvent is removed by distillation at about 15 mm. Hg pressure. The residue weighs 16 parts and is dissolved in 60 parts by volume of 30–60° petroleum ether and cooled for crystallization. The crystalline precipitate is filtered and dried, melting at 72–76°. The product N-n-octadecyl-3,5-di-t-butyl-4-hydroxyphenylacetamide is obtained in yield of 12.2 parts and is recrystallized from a mixture of 200 parts by volume of acetonitrile and 30 parts by volume of ethanol, melting at 79–81°.

If in Example 1, 7.9 parts of dodecylaniline are substituted for octadecylamine, then N-dodecylphenyl-3,5-di-t-butyl-4-hydroxyphenylacetamide is obtained.

If in Example 1, 8.3 parts of dodecylbenzylamine are substituted for octadecylamine, then N-dodecylbenzyl-3,5-di-t-butyl-4-hydroxyphenylacetamide is obtained.

If in Example 1, 3.9 parts of tertiary-octylamine are substituted for octadecylamine, then N-t-octyl-3,5-di-t-butyl-4-hydroxyphenylacetamide is obtained. Tertiary-octylamine has the formula:

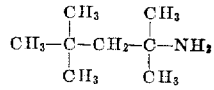

*Example 2.—3,5-di-t-butyl-4-hydroxyphenylacetomorpholide*

4.1 parts of morpholine and 4.85 parts of triethyl amine are dissolved in 60 parts by volume of benzene, and 12.7 parts of 3,5-di-t-butyl-4-hydroxyphenylacetyl chloride, dissolved in 20 parts by volume of benzene, are added dropwise at 37° over a period of 10 minutes. The reactants are heated under reflux for 2½ hours. 5.9 parts of triethylamine hydrochloride are filtered off, and the filtrate is washed with water and with saturated sodium bicarbonate solution, dried over anhydrous sodium sulfate, and the solvent is evaporated under vacuum. The distillation residue (16 parts) is dissolved in 30 parts by volume of hot isopropanol, the same volume of warm water is added and the solution cooled for crystallization. The precipitate is filtered, washed with isopropanol-water (1:1) and for further purification triturated with low boiling petroleum ether, whereupon 13 parts of 3,5-di-t-butyl-4-hydroxyphenylacetomorpholide are obtained, melting at 65–68°, which are further purified by recrystallization from a mixture of 125 parts by volume of 30–60° petroleum ether and 6 parts by volume of a mixture of isopropanol-petroleum ether (60:40) to give a melting point of 68–70°.

*Example 3.—N,N-bis-(2-ethylhexyl)-3,5-di-t-butyl-4-hydroxyphenylacetamide*

7.2 parts of freshly distilled di-2-ethylhexylamine and 3 parts of triethylamine are dissolved in 60 parts by volume of benzene and 8.6 parts of 2,6-di-t-butyl-4-hydroxy-phenylacetyl chloride, dissolved in 20 parts by volume of benzene, are added dropwise at 23° over a period of 10 minutes. The reactants are heated under reflux for 2½ hours, 3.5 parts of triethylamine hydrochloride are filtered and the benzene filtrate is washed first with water, then with saturated sodium bicarbonate solution, dried over anhydrous sodium sulfate, and the solvent removed by distillation at 15 mm. Hg pressure. The residue (14.7 parts) is purified by column chromatography using silica gel as packing. 10.5 parts of N,N - bis - (2 - ethylhexyl) - 3,5 - di - t - butyl - 4-hydroxyphenylacetamide are obtained as a viscous oil.

*Analysis.*—Calculated for C$_{32}$H$_{57}$NO$_2$ (M.W. 487.79): C, 78.78%; H, 11.79%; N, 2.87%. Found: C, 78.96%; H, 11.88%; N, 3.10%.

*Example 4.—N-n-octadecyl-β-(3,5-di-t-butyl-4-hydroxyphenyl)propionamide*

Octadecylamine (4.18 parts) is heated with stirring at 145–155° for 4 hours with 4.32 parts of β-(3,5-di-t-butyl-4-hydroxyphenyl)propionic acid, prepared from 2,6-di-t-butyl-p-cresol according to a series of reactions described by Coffield et al., J. Am. Chem. Soc., 79, 5022–5023 (1957). At the end of this heating period, titration of the reaction mixture for acidity indicates the reaction is 84% complete. The waxy solid (8.5 parts), obtained when the reaction mixture is cooled to room temperature, is recrystallized from methanol, yielding 5 parts of N-n-octadecyl-β-(3,5-di-t-butyl-4-hydroxyphenyl)propionamide, as an off-white powder, melting at 82–84°.

*Example 5.—N,N-di-(n-dodecyl)-3,5-di-t-butyl-4-hydroxy-phenylacetamide*

8.9 parts of di-n-dodecylamine and 3.1 parts of triethylamine are dissolved in 60 parts by volume of dry benzene and 7.2 parts of 3,5-di-t-butyl-hydroxyphenacyl chloride, dissolved in 20 parts by volume of dry benzene, are added dropwise with stirring at 35° over a period of 10 minutes. The temperature rises to 45° and the reactants are then heated at reflux for 3 hours. 3.6 parts of triethylamine hydrochloride are filtered off. The clear, red filtrate is washed twice with saturated sodium bicarbonate solution, once with saturated sodium chloride solution, dried over anhydrous sodium sulfate, and the solvent evaporated under vacuum. 15.5 parts of a dark oil are obtained. The oil is purified by elution chromatography on silica gel. Mixtures of hexane and benzene, and chloroform and benzene are used as eluants. 5.0 parts of N,N-di-(n-dodecyl)-3,5-di-t-butyl-4-hydroxyphenylacetamide are obtained as a light brown oil.

*Analysis.*—Calculated for C$_{40}$H$_{68}$O$_2$N: C, 80.06%; H, 12.26%; N, 2.33%. Found: C, 80.32%; H, 12.23%; N, 2.40%.

*Example 6.—N-(n-octadecylthioethyl)-3-(3',5'-di-tert.butyl-4'-hydroxyphenyl)propionamide*

11.0 parts of 2-aminoethyl-n-octadecylsulfide and 4.04 parts of triethylamine are dissolved in 150 parts by volume of dry benzene, and 10.7 parts of 3-(3',5'-di-tert.butyl-4'-hydroxyphenyl)propionyl chloride, dissolved in 100 parts by volume of dry benzene, are added dropwise at room temperature over a period of 45 minutes. The reactants are stirred at ambient temperature overnight. 7.1 parts of triethylamine hydrochloride are filtered off, and the filtrate treated as in Example 1. After drying over sodium sulfate, the benzene solution is filtered and stripped of solvent to give 16.3 parts of N-(n-octadecylthioethyl) - 3 - (3',5'-di-tert.butyl-4'-hydroxyphenyl)propionamide. Repeated crystallization from hexane gives the product as a white solid of constant melting point 70–72°.

*Example 7.—N-(3''-diethylamino-n-propyl)-3-(3',5', di-tert.butyl-4'-hydroxyphenyl)propionamide*

6.5 parts of 3-(diethylamino)propylamine and 12.1 parts of triethylamine are dissolved in 100 parts by volume of dry benzene, and 17.8 parts of 3-(3',5'-di-tert.butyl-4'-hydroxyphenyl)propionyl-chloride, dissolved in 200 parts by volume of dry benzene, are added dropwise at room temperature. The reactants are stirred at ambient temperatures overnight. 10.4 parts of triethylamine hydrochloride are filtered off and the filtrate treated as in Example 1. After drying over sodium sulfate, the drying agent is removed and the solvent stripped to give 18.5 parts of N-(3''-diethylamino-n-propyl)-3-(3',5'-di-tert.butyl-4'-hydroxyphenyl)propionamide. This is purified by dissolving in 5% hydrochloride acid, adding zinc dust, filtering, basifying and extracting with ether. After washing with saturated sodium chloride, the ethereal solution is dried over sodium sulfate, filtered and stripped of solvent to give the product as a pale yellow oil which boils at 225–250° at 20–30 microns.

*Analysis.*—Calculated for $C_{24}H_{42}O_2N_2$: C, 73.80; H, 10.84; N, 7.17. Found: C, 73.67; H, 10.76; N, 6.99.

*Example 8.—N-2-hydroxyethyl-N-lauroyloxyethyl-3-(3', 5'-di-tert.butyl-4'-hydroxyphenyl)propionamide*

12.1 parts of N,N-di-2-hydroxyethyl-3-(3',5'-di-tert.butyl-4'-hydroxyphenyl)propionamide and 12.1 parts of triethylamine are dissolved in 50 parts by volume of dry benzene, and 17.2 parts of lauroyl chloride added dropwise over a period of 0.5 hour while gently cooling the reaction vessel. The reactants are stirred at room temperature overnight. The resulting white solid is filtered off and the filtrate treated as in example 3. After drying over sodium sulfate, the benzene solution is filtered and stripped of solvent to give 24 parts of N-2-hydroxyethyl-N - lauroyloxyethyl-3-(3',5'-di-tert.butyl-4'-hydroxyphenyl)propionamide. Purification is achieved by chromatographing the product from 650 parts of alumina (neutral, activity I). After washing the column with benzene, the product is eluted with 1:1 chloroform-benzene. Removal of the solvent gives the product as a hydrocarbon-soluble oil.

*Analysis.*—Calculated for $C_{33}H_{57}O_5N$: C, 72.35; H, 10.49; N, 2.56. Found: C, 72.57; H, 10.69; N, 2.36.

*Example 9.—4-phenyl-1,7-bis[β-(3',5'-di-tert.butyl-4'-hydroxyphenyl)propionyl]-diethylenetriamine*

5.37 parts of anilino bis-(2-ethylamine) and 16.16 parts of triethylamine are dissolved in 200 parts by volume of dry benzene, and 21.4 parts of 3-(3',5'-di-tert.butyl-4'-hydroxyphenyl)propionyl chloride, dissolved in 150 parts by volume of dry benzene, are added dropwise over a period of 1.5 hours while gently cooling the reaction vessel. The reactants are stirred at room temperature overnight. The resulting white solid is filtered off and the filtrate treated as in Example 1. After drying over sodium sulfate, the benzene solution is filtered and stripped to give 19.6 parts of 4-phenyl-1,7-bis[β-(3',5'-di-tert.butyl-4'-hydroxyphenyl)propionyl]-diethylenetriamine. Several crystallizations from methylene dichloride yield the product as a white solid of constant melting point 184–185°.

*Example 10.—N-lauroyl-N'-[3-(3',5'-di-tert.butyl-4'-hydroxyphenyl)propionyl]ethylenediamine*

7.51 parts of N-aminoethyl lauramide and 5.05 parts of triethylamine are dissolved in 100 parts by volume of dry benzene, and 12.5 parts of 3-(3',5'-di-tert.butyl-4'-hydroxyphenyl)propionyl chloride, dissolved in 100 parts by volume of dry benzene, are added dropwise at room temperature over a 1.5 hour interval. The reactants are stirred at room temperature overnight. 3.6 parts of triethylamine hydrochloride are filtered off and the filtrate treated as in Example 1. After drying over sodium sulfate, the benzene solution is filtered and the solvent stripped under diminished pressure to give 15.7 parts of N - lauroyl - N'-[3-(3',5'-di-tert.butyl-4'-hydroxyphenyl)propionyl]ethylenediamine. Purification is achieved by first chromatographing the product through 167 parts of silica gel, washing the column with benzene, chloroform and finally eluting the product with acetone. Removal of the acetone leaves a residue, which after trituration with petroleum ether and crystallation from aqueous ethanol gives a white solid having melting point 122–124°.

*Example 11.—Stabilization of polypropylene*

Unstabilized polypropylene powder (Hercules PROFAX 6501) is thoroughly blended with 0.5% by weight of N,N - di - (n - dodecyl) - 3,5 - di - t - butyl - 4 - hydroxyphenylacetamide, made according to Example 5 hereinabove. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of N,N - di - (n - dodecyl) - 3,5 - di - t - butyl - 4 - hydroxyphenylacetamide and polypropylene is stabilized against oxidative deterioration for 1000 hours. The unstabilized polypropylene deteriorates after only 3 hours.

In like manner as in this example, stabilized compositions of polypropylene are prepared having 0.5% by weight of a compound prepared according to each of the foregoing examples (1–10 inclusive).

In a similar manner as in this example, stable compositions of polypropylene are prepared with 0.5% by weight of one compound according to each of the preceding examples (1–10 inclusive) together with 0.5% by weight of di-lauryl-β-thio-dipropionate. In some cases the improvement is so remarkable that a synergistic effect is observed in the oven-aging test.

*Example 12.—Stabilization of mineral oil*

A water-white, refined (U.S.P. grade) mineral oil (Esso PRIMOL D) is stabilized under the following test conditions.

A sample of mineral oil (10 parts) is placed in a Slight-type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm. Hg pressure within the flask with reference to the maximum pressure obtained at 150°. The stabilized mineral oil contains 0.1% by weight of N-n-octadecyl - β - (3,5 - di - t - butyl - 4 - hydroxyphenyl) propionamide.

*Example 13.—Stabilization of a resin containing elastomer*

High impact polystyrene resin containing elastomer (i.e. butadiene-styrene) is stabilized against loss of elongation properties by incorporation of 0.5% by weight of N - n - octadecyl - β - (3,5 - di - t - butyl - 4 - hydroxyphenyl)propionamide. Under the test conditions described hereinbelow, the stabilized resin retains 85% of its original elongation properties, whereas the unstabilized resin retains only 15% of its elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mil). The sheets are then cut into strips, approximately 4 x 0.5 inches. A portion of these strips is then measured for length of elongation in the Instron tensile tester (Instron Engineering Corporation, Quincy, Massachusetts). The remaining portion of the strips is aged in a forced draft oven for 6 weeks at 75° and thereafter tested for elongation.

A similar amount of N-n-octadecyl-3,5-di-t-butyl-4-hydroxyphenylacetamide also is effective in stabilizing high impact polystyrene (65% elongation retained, blank being 15%).

What is claimed is:

1. The stabilizer compound of the formula:

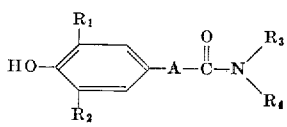

wherein

A is a member selected from the group consisting of lower alkylene and iso-lower-alkylene;
$R_1$ is a tertiary alkyl group, having 4 to 18 carbon atoms;
$R_2$ is a member selected from the group consisting of alkyl, having from 1 to 18 carbon atoms, and hydrogen;
$R_3$ is a member selected from the group consisting of (i) alkyl, having from 1 to 24 carbon atoms, (ii) hydrogen, (iii) —$CH_2CH_2$— when $R_4$ is the

—$CH_2CH_2O$— group, (iv) alkylphenyl, having 7 to 24 carbon atoms, (v) alkylbenzyl, having 8 to 24 carbon atoms, (vi) hydroxy-lower alkyl;
$R_4$ is a member selected from the group consisting of (i) alkyl, having from 1 to 24 carbon atoms, (ii)

—$CH_2CH_2O$— when joined to N and to $R_3$ to form the morpholino radical, (iii) alkylphenyl, having from 7 to 24 carbon atoms, (iv) alkylbenzyl, having from 8 to 24 carbon atoms, (v) (alkylthio)lower alkylene, having 2 to 20 carbon atoms, (vi) (di-lower alkylamino )lower alkylene having 3 to 15 carbon atoms, (vii) (carbalkoxy) lower alkylene, having 3 to 14 carbon atoms, (viii) alkanoamido)lower alkylene, having 3 to 14 carbon atoms, and (ix) the group of the formula

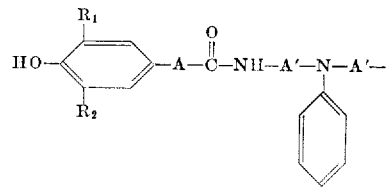

wherein $R_1$, $R_2$ and A are as defined above,
and A' is defined the same as A.

2. N - n - octadecyl - 3,5 - di - t - butyl - 4 - hydroxyphenylacetamide.

3. 3,5-di-t-butyl-4-hydroxyphenylacetomorpholide.

4. N,N - bis - (2 - ethylhexyl) - 3,5 - di - t - butyl - 4-hydroxyphenylacetamide.

5. N - n - octadecyl - β - (3,5 - di - t - butyl - 4 - hydroxyphenyl) -propionamide.

6. N - (n - octadecylthioethyl) - 3 - (3' - 5' - di-tert.butyl-4'-hydroxyphenyl)propionamide.

7. N - (3" - diethylamino - n - propyl) - 3 - (3',5' - di-tert.butyl-4'-hydroxyphenyl)propionamide.

8. N - 2 - hydroxyethyl - N - lauroyloxyethyl - 3 - (3',5'-di-tert. butyl-4'-hydroxyphenyl)propionamide.

9. N - lauroyl - N' - [3 - (3',5' - di - t - butyl - 4 - hydroxyphenyl)propionyl]ethylenediamine.

10. N,N - di - (n - dodecyl) - 3,5 - di - t - butyl - 4-hydroxyphenylacetamide.

11. 4 - phenyl - 1,7 - bis[β - 3',5' - di - tert. butyl - 4'-hydroxyphenyl)propionyl]diethylenetriamine.

References Cited by the Examiner

UNITED STATES PATENTS

| | | | |
|---|---|---|---|
| 2,608,581 | 8/1952 | Zienty | 260—559 |
| 2,874,188 | 2/1959 | Micucci et al. | 260—559 XR |
| 2,877,156 | 3/1959 | Janssen et al. | 260—559 XR |
| 2,952,678 | 9/1960 | Lane | 260—247.7 |
| 2,964,479 | 12/1960 | Cyba | 252—403 |
| 3,003,996 | 10/1961 | Newland et al. | 260—45.9 |
| 3,006,918 | 10/1961 | De Jongh et al. | 260—559 XR |
| 3,061,553 | 10/1962 | Riggs | 260—559 |
| 3,121,732 | 2/1964 | Meier et al. | 260—465 |

OTHER REFERENCES

Sheiman et al., Chem. Abst., 55: 21104h (61) (actual reference published Vestnik Moskov Univ., Ser. II, 15, Nos. 5, 65–8 (1960).

WALTER A. MODANCE, *Primary Examiner.*

NICHOLAS S. RIZZO, JOHN D. RANDOLPH,
*Examiners.*

ROBERT L. PRICE, JOSE TOVAR, AVROM D. SPEVACK, *Assistant Examiners.*